United States Patent
Lu et al.

(10) Patent No.: US 6,853,794 B2
(45) Date of Patent: Feb. 8, 2005

(54) APPARATUS FOR CLEANING OPTICAL FIBER CONNECTORS AND FIBER OPTIC PARTS

(75) Inventors: Le Lu, Des Moines, WA (US); Shangyuan Huang, Kent, WA (US); Zhongming Mao, Kent, WA (US); Ke-Xun Sun, Mercer Island, WA (US)

(73) Assignee: Lightel Technologies Inc., Kent, WA (US)

( * ) Notice: Subject to any disclaimer, the term of this patent is extended or adjusted under 35 U.S.C. 154(b) by 170 days.

(21) Appl. No.: 10/189,243

(22) Filed: Jul. 2, 2002

(65) Prior Publication Data

US 2004/0005134 A1 Jan. 8, 2004

(51) Int. Cl.[7] .............................. G02B 6/00; B08B 3/10
(52) U.S. Cl. ........................ 385/134; 385/147; 134/184
(58) Field of Search .................................. 385/134, 147; 134/105, 184–198

(56) References Cited

U.S. PATENT DOCUMENTS

| | | | | |
|---|---|---|---|---|
| 4,016,436 A | * | 4/1977 | Shoh ........................... 310/322 |
| 4,733,428 A | * | 3/1988 | Malinge et al. ............... 15/302 |
| 5,927,306 A | * | 7/1999 | Izumi et al. .................. 134/155 |
| 6,085,763 A | * | 7/2000 | Esmaeili et al. ............. 134/113 |
| 6,106,635 A | * | 8/2000 | Hamada et al. ................ 134/33 |
| 6,493,289 B2 | * | 12/2002 | Kitaori et al. ............... 367/189 |
| 6,659,365 B2 | * | 12/2003 | Gipson et al. ........... 239/102.2 |
| 2002/0195123 A1 | * | 12/2002 | Strait ............................. 134/8 |

FOREIGN PATENT DOCUMENTS

EP 351416 B1 * 11/1992 ............. B06B/3/00

* cited by examiner

Primary Examiner—Rodney Bovernick
Assistant Examiner—Juliana K. Kang
(74) Attorney, Agent, or Firm—Law Offices of David Pai; Chao-Chang David Pai; Ian Graham Clapp

(57) ABSTRACT

An apparatus comprising an acoustically resonant ultrasound launcher is provided for cleaning of optical fiber connectors and other optical fiber parts. The resonant ultrasound launcher is designed to transfer and to focus ultrasonic energy from an ultrasound transducer to a relatively small target area with high intensity. Specially designed fluid flow channels allow this apparatus to efficiently clean optical fiber connectors with an exposed end surface or with an end surface concealed in a connector adapter. Circuitry is provided to automatically track the frequency to enhance the ultrasound generation. Another circuitry is provided to program the sequence of the cleaning process, including washing, rinsing and drying.

45 Claims, 12 Drawing Sheets

APPARATUS FOR CLEANING OPTICAL FIBER CONNECTORS AND FIBER OPTIC PARTS

BACKGROUND OF THE INVENTION

1. Field of the Invention

The present invention relates to the cleaning of optical fiber connectors, particularly to the cleaning of in-adapter optical fiber connectors, and more particularly, to ultrasound apparatus for cleaning optical fiber connectors.

2. Background Art

In a typical optical fiber connector, an optical fiber has a terminal portion which has a side wall surrounded by a ferrule. An adapter is needed to couple the light from the fiber in one connector to the fiber in another connector. A pair of connector ferrules can be accurately aligned face to face via the sleeve inside the adapter. An in-adapter connector, i.e., an assembly with a connector that is plugged into an adapter, is typically referred to as a "female" connector, whereas a free connector which is not in an adapter is typically referred to as a "male" connector. Female connectors can exist in many fiber optic systems and equipment, e.g. on connector rack panels or instrument front panels. In these cases, one side of the adapter is linked with an internal fiber connector, which is relatively permanent, whereas the other side of the adapter which faces the outside is for external fiber connectors.

The ferrule-sleeve connection system has been implemented in various types of standard and non-standard optical fiber connectors. Some examples of conventional ferrule-sleeve connector systems include FC, SC, ST, LC, MU, MT-RJ, etc, in which there can be PC (physical contact) type or APC (angled physical contact) type of connections.

During the use of optical fiber communications equipment, various contaminants including dust, finger oils, and grease may accumulate in optical fiber connectors and settle on fiber and ferrule end surfaces. Contaminants may be carried by ambient air or introduced to the fiber and ferrule end surfaces by the hands of a human operator, for example. The presence of such contaminants may significantly attenuate or even completely block the transmission of optical signals through the optical fiber connectors, or cause undesirable reflection of optical signals, thereby significantly degrading the performance of the optical fiber telecommunications equipment.

A few conventional methods have been used in the industry to clean male connectors. For example, it has been common practice in the industry to use cotton swabs or foam swabs with a solvent such as alcohol. Another common tool, especially useful for field applications, is a cleaning cassette with a replaceable reel of cloth tape. A cleaning operation for each connector requires the use of a new section of the cloth. A disadvantage associated with the above methods is that some residual cleaner materials such as cotton fibers may remain on the connectors. Furthermore, they cannot be conveniently used for female connector cleaning.

In a conventional cleaning operation for a female connector, a user typically needs to first unplug the connector from the adapter, i.e., to convert the female connector to a male connector. This conversion is typically very inconvenient and time consuming. For example, to clean a female connector on an instrument panel, the user needs to open the instrument box, unplug the internal fiber connector from the inner side of the adapter, clean the connector ferrule surface, replug it back to the adapter, and then close the instrument box. Attempts have been made to avoid opening the box by using adhesive sticks or adhesive tapes in a cartridge to stick out contaminants from the female connector surface through the adapter. However, this method is usually ineffective and costly. During the cleaning operation, it is desirable that the user be very careful not to re-contaminate the connector system.

Therefore, there is a need for an improved apparatus for cleaning optical fiber connector systems for highly efficient removal of various types of contaminants within a short time and easy adaptation to different types of connectors, especially when the connectors are in-adapter female connectors.

SUMMARY OF THE INVENTION

The present invention provides ultrasound-based cleaning apparatus for cleaning optical fiber connectors as well as other types of optical fiber parts.

For female connector cleaning, the apparatus in an embodiment generally comprises:

a resonant ultrasound launcher comprising a base portion and an end portion terminating at a launcher end; and an enclosure having an end portion terminating at an enclosure tip, the end portion having an inner surface defining a hollow interior in which the end portion of the resonant ultrasound launcher is positioned, wherein the inner surface of the end portion of the enclosure is concentric with the end portion of the resonant ultrasound launcher, and wherein the launcher end is recessed from the enclosure tip by a differential depth.

For male connector cleaning, the apparatus in an embodiment generally comprises a miniature cleaning bath on a resonant ultrasound launcher. In another embodiment, the apparatus generally comprises a resonant ultrasound launcher with controlled liquid flow and air flow in the vicinity of the launcher.

Advantageously, the apparatus according to embodiments of the present invention are capable of cleaning various types of male or female optical fiber connectors as well as other optical fiber parts thoroughly and efficiently.

BRIEF DESCRIPTION OF THE DRAWINGS

The present invention will be described with particular embodiments thereof, and references will be made to the drawings in which:

FIGS. 13A–C show a side view of yet another embodiment of the apparatus for cleaning male connectors or other optical fiber parts according to the present invention, with an open gap between the end of the resonant ultrasound launcher and the end surface of a male connector ferrule, wherein FIG. 13A shows the beginning period of the process during which the water dispenser delivers clean water drops to the connector surface, FIG. 13B shows the ultrasonic cleaning period during which the water is being held within the gap between the end of the resonant ultrasound launcher and the end of the male connector while ultrasound is on, and FIG. 13C shows the drying period during which clean air is blown toward the connector ferrule surface for blow dry.

DETAILED DESCRIPTION

Figure 1A:
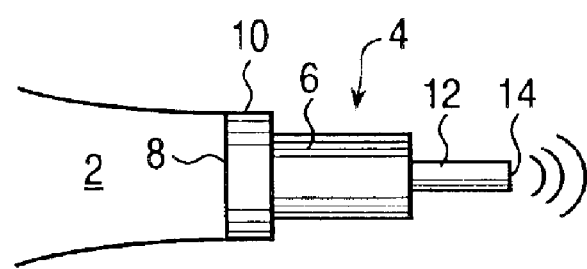
FIG. 1A shows a side view of an ultrasound transducer and a resonant ultrasound launcher with multiple stepped stages, as part of an apparatus for cleaning optical fiber connectors or fiber optic parts in an embodiment according to the present invention.

FIG. 1A is a side view of an ultrasound transducer 2 and a resonant ultrasound launcher with three stages of stepped portions 10, 6, and 12. In this embodiment, the ultrasound transducer 2 has a transducer end 8 that is connected to the base portion 10 of the resonant ultrasound launcher 4. The ultrasound transducer may be a conventional piezo-electric transducer that produces mechanical vibrations at ultrasonic frequencies in response to electrical pulses applied to the transducer. Because conventional piezo-electric ultrasound transducers are well known to a person skilled in the art, only the end portion of the ultrasonic transducer 2 is shown in FIG. 1A to simplify the illustration.

In an embodiment, the resonant ultrasound launcher 4 is made of the same metallic material as that of the ultrasound transducer 2, to prevent reflection of sound waves at the transducer end 8 that is connected to the base portion 10 of the resonant ultrasound launcher 4. Moreover, the base portion of the launcher 10 and the transducer end 8 are designed to have the same diameter so as to increase the ultrasound transmission area. Tight coupling of the resonant ultrasound launcher 4 with the ultrasound transducer 2 allows the sound waves to be transmitted to the resonant ultrasound launcher 4 to produce resonance without significant reflection or attenuation at the transducer end 8. The shape and the dimension of the resonant ultrasound launcher 4 are designed such that its resonant frequency matches the resonant frequency of the ultrasound transducer 2.

In the embodiment shown in FIG. 1A, the resonant ultrasound launcher has a multi-stage structure with a base portion 10, a transitional portion 6, and an end portion 12 that terminates at a launcher end 14. In this embodiment, the transitional portion 6 is a cylindrical portion which has a diameter less than that of the base portion 10 but greater than that of the end portion 12. The base portion 10, the transitional portion 6, and the end portion 12 of the resonant ultrasound launcher 4 form multiple stages with sharp steps. In an embodiment, the cross section and the length of each stage is designed for a high quality factor (Q). The ultrasound intensity in the small focusing area at the end 14 of the resonant ultrasound launcher 4 may be as much as greater than tens or up to a hundred times the intensity at the end 8 of the ultrasound transducer 2.

Figure 1B:
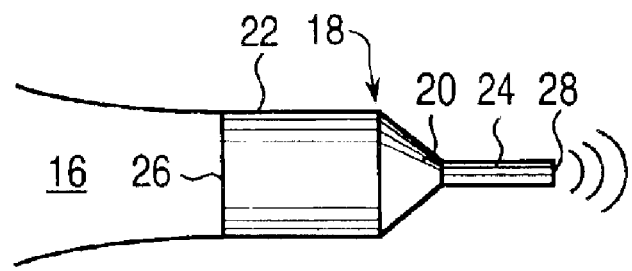
FIG. 1B shows a side view of another embodiment of an ultrasound transducer and a resonant ultrasound launcher with multiple sloped stages instead of stepped stages.

FIG. 1B is a side view of another embodiment of an ultrasound transducer 16 and a resonant ultrasound launcher 18. This Figure shows a launcher with two stages and there is a sloped transitional portion 20 between the base portion 22 and the end portion 24 of the resonant ultrasound launcher 18. The base portion 22 of the resonant ultrasound launcher 18 is connected to the end 26 of the ultrasound transducer 16. In an embodiment, the resonant ultrasound launcher 18 and the ultrasound transducer 16 are made of the same metallic material with a tight connection between the transducer end 26 and the base portion 22 of the resonant ultrasound launcher 18 to allow sound energy to be coupled to the end 28 of the launcher 18 efficiently.

The sloped transitional portion 20 of the resonant ultrasound launcher 18 has progressively decreasing diameters along its cross section between the base portion 22 and the end portion 24. The cross sections and the lengths of the base portion 22, the transitional portion 20 and the end portion 24 of the resonant ultrasound launcher 18 are designed to produce high ultrasound intensity in the small focusing area at the launcher end 28.

In an embodiment, the dimensions of the base portion 22 and the end portion 24 as well as the slope in the transitional portion 20 may be purposefully designed to result in a reduced peak quality factor (Q) with a corresponding increase in the resonance frequency band, thereby allowing easier and less critical locking of resonant frequencies. In this manner, a satisfactory degree of overall ultrasound resonance can be maintained. Although the embodiment shown in FIG. 1B illustrates a transitional portion 20 with a straight slope between the base portion 22 and the end portion 24 of the resonant ultrasound launcher 18, the transitional portion may have curved or tapered slopes in other embodiments.

Furthermore, more than one transitional portion in a multi-stage structure may be provided between the base and end portions of the resonant ultrasound launcher either with sharp steps or with slopes to achieve a desired peak Q and a desired resonant bandwidth. In another embodiment, multiple transitional stages including a combination of sharp steps and slopes may be provided between the base portion and the end portion of the resonant ultrasound launcher. The shapes and the dimensions of a multi-stage resonant ultrasound launcher may be designed by a person skilled in the art of mechanical engineering to achieve desired Q values and resonant bandwidths in a conventional manner.

Figure 2:
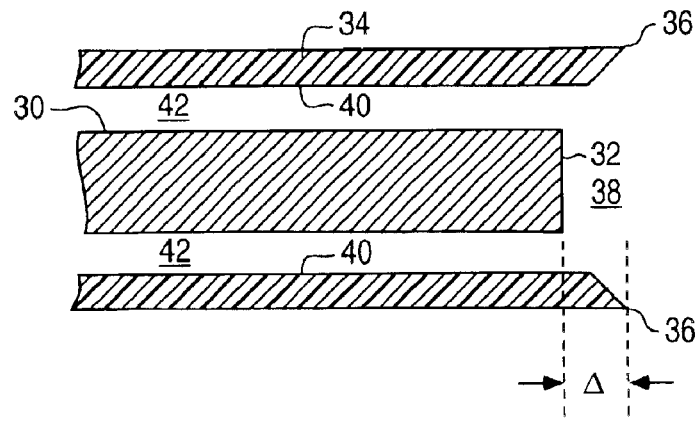
FIG. 2 shows a side-sectional view of a portion of the apparatus for cleaning optical fiber connectors or fiber optic parts, illustrating the end portion of an enclosure and an end portion of a resonant ultrasound launcher in an embodiment according to the present invention.

FIG. 2 shows a side-sectional view of an end portion of an apparatus for cleaning optical fiber connectors in an embodiment according to the present invention. In FIG. 2, the end portion 30 of the resonant ultrasound launcher terminating at a launcher end 32 is shown for simplicity of illustration. FIG. 2 also shows an end portion of an enclosure 34 which terminates at an enclosure tip 36 forming an opening 38. The end portion of the enclosure 34 has an inner surface 40 defining a hollow interior 42 in which the end portion of the resonant ultrasound launcher 30 is positioned. The end 32 of the resonant ultrasound launcher 30 is recessed from the enclosure tip 36 by a differential depth $\Delta$.

Figure 3:
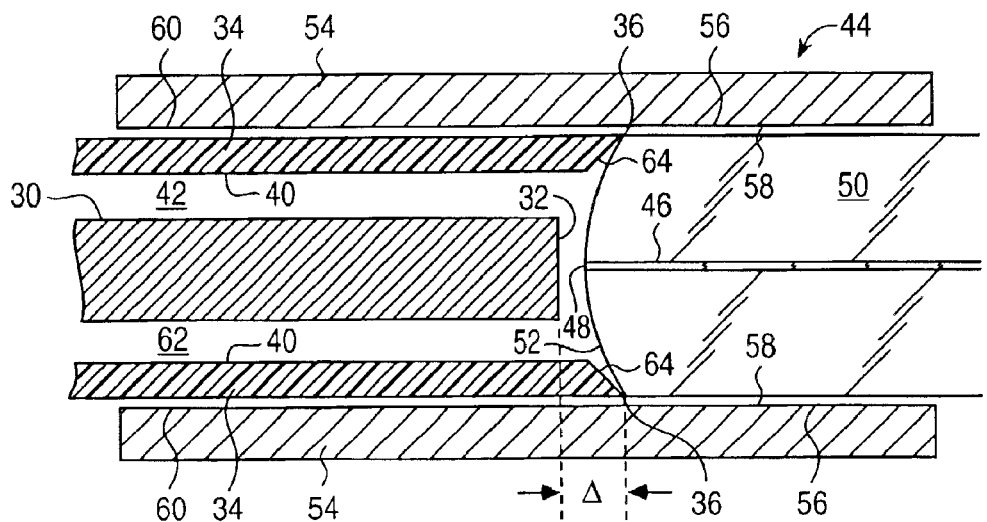
FIG. 3 shows a side-sectional view of the portion of the apparatus of FIG. 2 inserted into the sleeve of a connector adapter.

FIG. 3 shows a side-sectional view of the end portion of the cleaning apparatus of FIG. 2 inserted into a conventional optical fiber connector adapter. In this Figure, only the guiding sleeve inside the adapter, 54, is shown. FIG. 3 also shows a connector ferrule inserted in this sleeve from the opposite side. This connector ferrule is the object to be cleaned. As defined before, this connector and the adapter together form a 'female' connector 44.

The connector terminates at an exposed fiber end 48, and a ferrule 50 which encloses the end section of the optical fiber 46 and has a ferrule end 52 of a predefined shape adjacent the exposed fiber end 48. The guiding sleeve of the connector adapter, 54, has an inner surface 56 comprising a first portion 58 enclosing the ferrule 50 and a second portion 60 extending beyond the ferrule end 52.

As shown in FIG. 3, the end portion of the cleaning apparatus is inserted into the guiding sleeve 54 of the female optical fiber connector 44 for cleaning the optical fiber end 48 as well as the ferrule end 52. The enclosure tip 36 is inserted into the guiding sleeve 54 until it is in contact with the ferrule end 52. The enclosure tip 36 is shaped to match the predefined shape of the ferrule end 52 to form a tightly enclosed chamber 62 in which the end 32 of the resonant ultrasound launcher 30 is positioned for highly efficient clean liquid delivery and the dirty liquid suction.

In the embodiment shown in FIG. 3, the enclosure tip 36 has a beveled end surface 64 for matching the shape of the connector ferrule end 52. Different types of optical fiber connectors may have ferrule ends of different shapes, and the enclosure tip of the cleaning apparatus may be machined differently for matching the particular shape of the ferrule end of a particular type of connector. Different manufacturers may produce ferrules of slightly different end shapes even for the same type of connectors. In some optical fiber connectors, the cross-sectional shape of the interior of the guiding sleeve may not even be circular. For these optical fiber connectors, the end portion of the enclosure need be shaped to form a tightly enclosed chamber to prevent any fluid leakage from the chamber.

It is usually desirable that the outer diameter of the end portion of the enclosure 34 be small enough for inserting into the interior of the guiding sleeve 54 of the female optical fiber connector 44. On the other hand, the inner diameter of the end portion of the enclosure 34 need be large enough to avoid contacting the end portion of the resonant ultrasound launcher 30 and not to block much of the ferrule surface. Therefore, the end portion of the enclosure 34 of the cleaning apparatus has a thin side wall made of a strong and slightly flexible material to seal tightly with the ferrule end 52.

The material for the end portion of the enclosure 34 may be a strong plastic material, a metal, or a composite material such as carbon fiber that does not tend to have loose particles. The end portion of the enclosure 34 and the end portion of the resonant ultrasound launcher 30 in the embodiment shown in FIGS. 2–3 are coaxially positioned with respect to each other to form a concentric structure. The launcher end 32 is recessed from the enclosure tip 36 by a differential depth $\Delta$ to allow some space between the launcher end 32 and the optical fiber end 48 for fluid action during cleaning operations.

The differential depth $\Delta$ between the launcher end 32 and the enclosure tip 36 may need to be set differently for cleaning conventional PC and APC connectors because APC connectors typically have angled end shapes different from the end shapes of PC connectors. Even for connectors of the same type, different manufacturers may provide slightly different ferrule end shapes. Therefore, adjustments to the differential depth $\Delta$ may be necessary for the same cleaning apparatus to adapt to optical fiber connectors of different end shapes.

Figure 4:
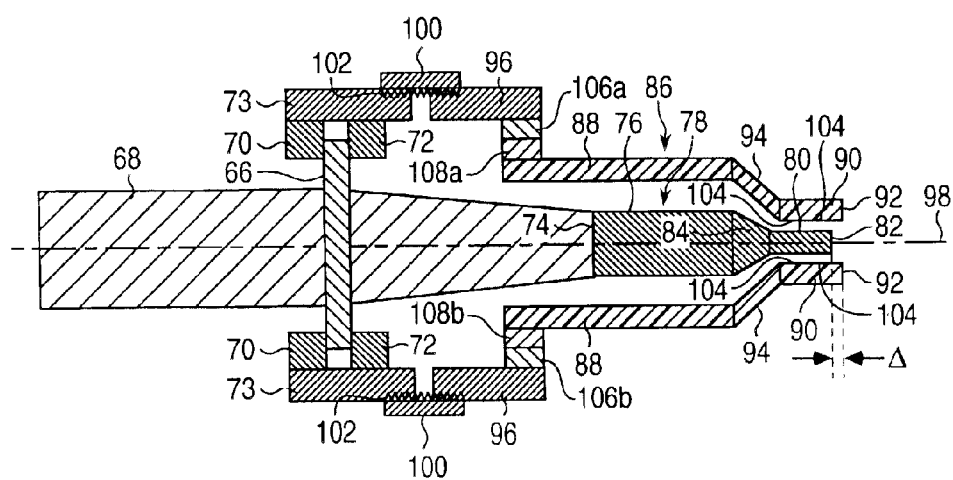
FIG. 4 shows a side-sectional view of an apparatus for cleaning optical fiber connectors in an embodiment according to the present invention, illustrating an adjustable enclosure assembly and a sloped transitional portion in the resonant ultrasound launcher.

FIG. 4 shows a side-sectional view of a cleaning apparatus in an embodiment according to the present invention, illustrating a structure for easily adjusting the differential depth $\Delta$ between the launcher end and the enclosure tip. In FIG. 4, a plurality of plates 70 and 72 are clamped to the flange 66 of the transducer 68 via a base ring 73. In the embodiment shown in FIG. 4, the ultrasound transducer 68 has a transducer end 74 which is connected to a base portion 76 of a resonant ultrasound launcher 78. The resonant ultrasound launcher 78 also has an end portion 80 which terminates at a launcher end 82 and an intermediary portion 84 with a sloped surface between the base portion 76 and the end portion 80.

An enclosure 86 which is concentric with the resonant ultrasound launcher 78 also has a base portion 88, an end portion 90 which terminates at an enclosure tip 92, and an intermediary portion 94 with sloped inner and outer surfaces between the base portion 88 and the end portion 90. The base portion 88 of the enclosure 86 is connected to a movable ring 96, which is movable longitudinally parallel to the axis 98 of the enclosure 86 and the resonant ultrasound launcher 78. In an embodiment, a positioning ring 100 is provided between the base ring 73 and the movable ring 96 for moving the movable ring 96 longitudinally with respect to the base ring 73, which is fixed with respect to the ultrasound transducer 68 and the resonant ultrasound launcher 78. In an embodiment, threads 102 are provided on the positioning ring 100 as well as portions of the base ring 73 and the movable ring 96, such that the threaded positioning ring 100 can be rotated about the axis 98 to change the longitudinal position of the movable ring 96 with respect to the fixed base ring 73, thereby adjusting the differential depth $\Delta$ between the launcher end 82 and the enclosure tip 92.

Because many types of conventional optical fiber connectors have small ferrule diameters, for example, 2.5 mm for convention FC, SC and ST connectors and 1.25 mm for conventional LC and MU connectors, the diameters of the end portion 90 of the enclosure 86 and the end portion 80 of the resonant ultrasound launcher 78 need be small enough to match the small diameters of optical fiber connectors. On the other hand, however, in order to achieve reasonable coupling of ultrasound energy from the transducer 68 to the end 82 of the resonant ultrasound launcher 78, the cross section of the end portion 80 of the resonant ultrasound launcher 78 generally should not be too small relative to the end portion 90 of the enclosure 86. In order to avoid any contact between the end portion 80 of the resonant ultrasound launcher 78 and the end portion 90 of the enclosure 86, and to provide adequate spacing for the flow of fluids during cleaning operations, it is desirable that the inner surface 104 of the end portion 90 of the enclosure 86 and the end portion 80 of the resonant ultrasound launcher 78 be highly concentric about the center axis 98.

In order to achieve a high degree of concentricity of the inner surface 104 of the end portion 90 of the enclosure 86 and the end portion 80 of the resonant ultrasound launcher 78, a plurality of offset rings 106a–b and 108a–b are provided between the movable ring 96 and the base portion 88 of the enclosure 86 in the embodiment shown in FIG. 4. The offset rings 106a–b and 108a–b may have their inner and outer surfaces machined before being assembled to the movable ring 96 and the base portion 88 of the enclosure 86 to hold the enclosure 86 in place.

The outer offset ring 106a–b may have a top portion 106a which has a thickness different from that of a bottom portion 106b, while the inner offset ring 108a–b may have a top portion 108a which has a thickness different from that of a bottom portion 108b. The offset rings 106a–b and 108a–b may be machined in a manner apparent to a person skilled in the art to eliminate or at least to reduce the possible misalignment between the geometric center axis of the enclosure 86 and the geometric center axis 98 of the resonant ultrasound launcher 78.

Figure 5:
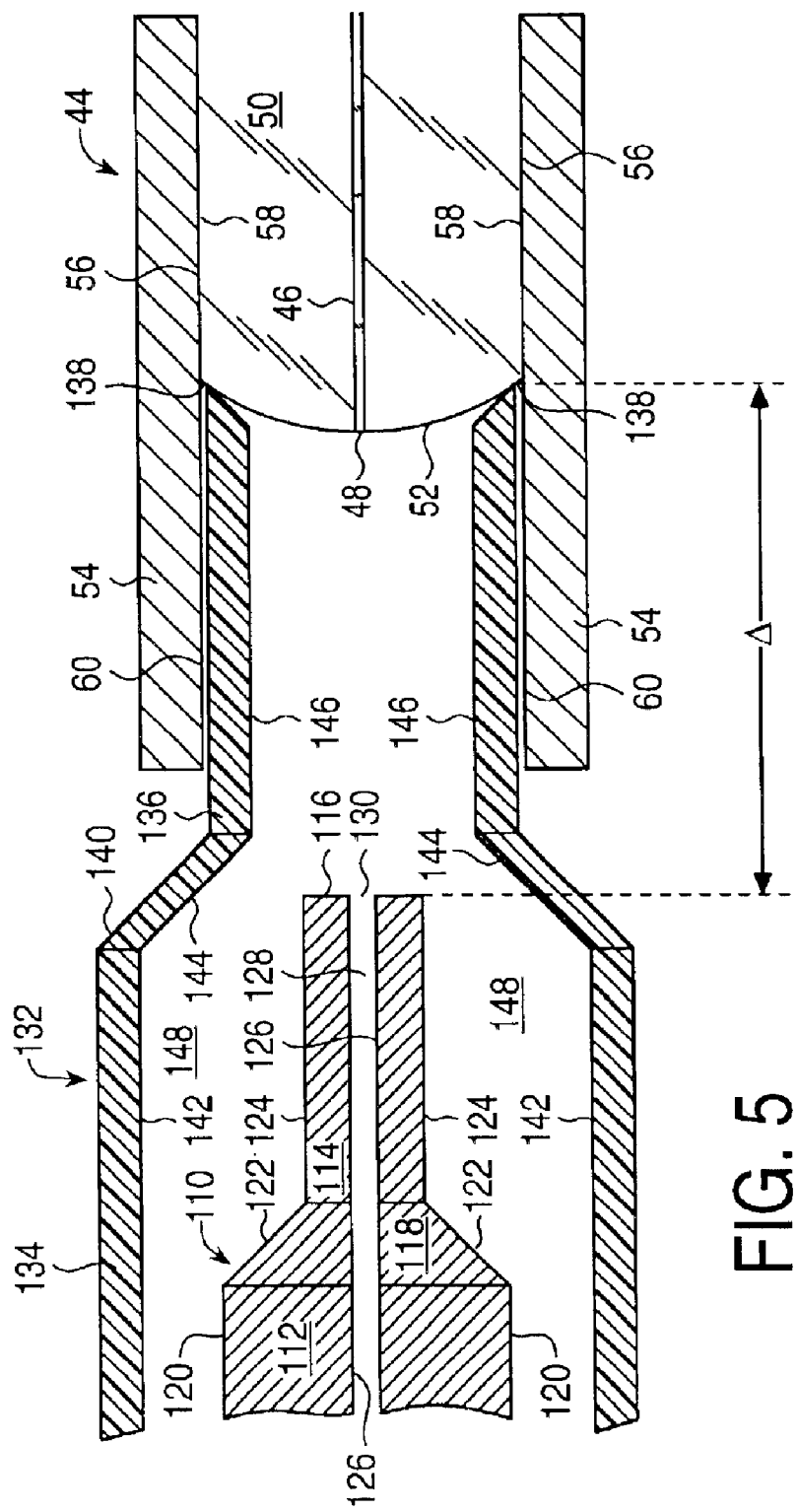
FIG. 5 shows a side-sectional view of another embodiment of the apparatus for cleaning optical fiber connectors, with a center channel within the resonant ultrasound launcher and side channel between the enclosure and the resonant ultrasound launcher for conveying the washing or rinsing fluid or drying air to clean the fiber and ferrule end surfaces of a female optical fiber connector.

FIG. 5 shows a side-sectional view of another embodiment of an end portion of an apparatus for cleaning optical fiber connectors according to the present invention. In this embodiment, a resonant ultrasound launcher 110 is provided with a base portion 112, an end portion 114 which terminates at a launcher end 116, and an intermediary sloped portion 118 with progressively decreasing diameters between the base portion 112 and the end portion 114. In this embodiment, the resonant ultrasound launcher 110 has outer surfaces 120, 122 and 124, and an inner surface 126 which defines a center channel 128 with an opening 130 at the launcher end 116 for fluid flow during cleaning operations.

In the embodiment shown in FIG. 5, an enclosure 132 is provided with a base portion 134, an end portion 136 which terminates at an enclosure tip 138, and an intermediary portion 140 with progressively decreasing diameters between the base portion 134 and the end portion 136. The enclosure 132 has inner surfaces 142, 144 and 146 which are spaced apart from the outer surfaces 120, 122 and 124 of the resonant ultrasound launcher 110, thereby defining a side channel 148 for the fluid flow during cleaning operations. The end 116 of the resonant ultrasound launcher 110 is recessed from the enclosure tip 138 by a differential depth Δ.

FIG. 5 shows a female optical fiber connector 44 of the same type which is shown in FIG. 3 and described above connected to the end portion of the cleaning apparatus which includes a center channel 128 and a side channel 148 for flow of fluids. As shown in FIG. 5, the end portion 136 of the enclosure 132 is sized and shaped to match the portion 60 of the inner surface 56 of the guiding sleeve 54. The enclosure tip 138 is shaped to match the end 52 of the ferrule 50 which encloses the end portion of the optical fiber 46. In an embodiment, a structure similar to that in FIG. 4 and described above may be implemented to adjust the differential depth Δ in FIG. 5 to move the end 116 of the resonant ultrasound launcher 110 closer to the end 48 of the optical fiber 46. Alternatively, the launcher end 116 may remain relatively far away from the fiber end 48 and the ferrule end 52 during cleaning operations in the embodiment shown in FIG. 5 if ultrasound generation is sufficiently strong and adequate flow of the cleaning fluid is maintained by the center channel 128 and the side channel 148. In this embodiment, an unused or clean fluid can be fed through the center channel 128 to reach the fiber end 48 and the ferrule end 52 to clean the end surfaces, and used or dirty fluid can be sucked back from these end surfaces through the side channel 148. The fluid flow may also be in a reverse direction, that is, the clean fluid may flow through the side channel 148 to reach the fiber and ferrule end surfaces 48 and 52, and the dirty fluid can be sucked back from these end surfaces through the center channel 128.

Figure 6:
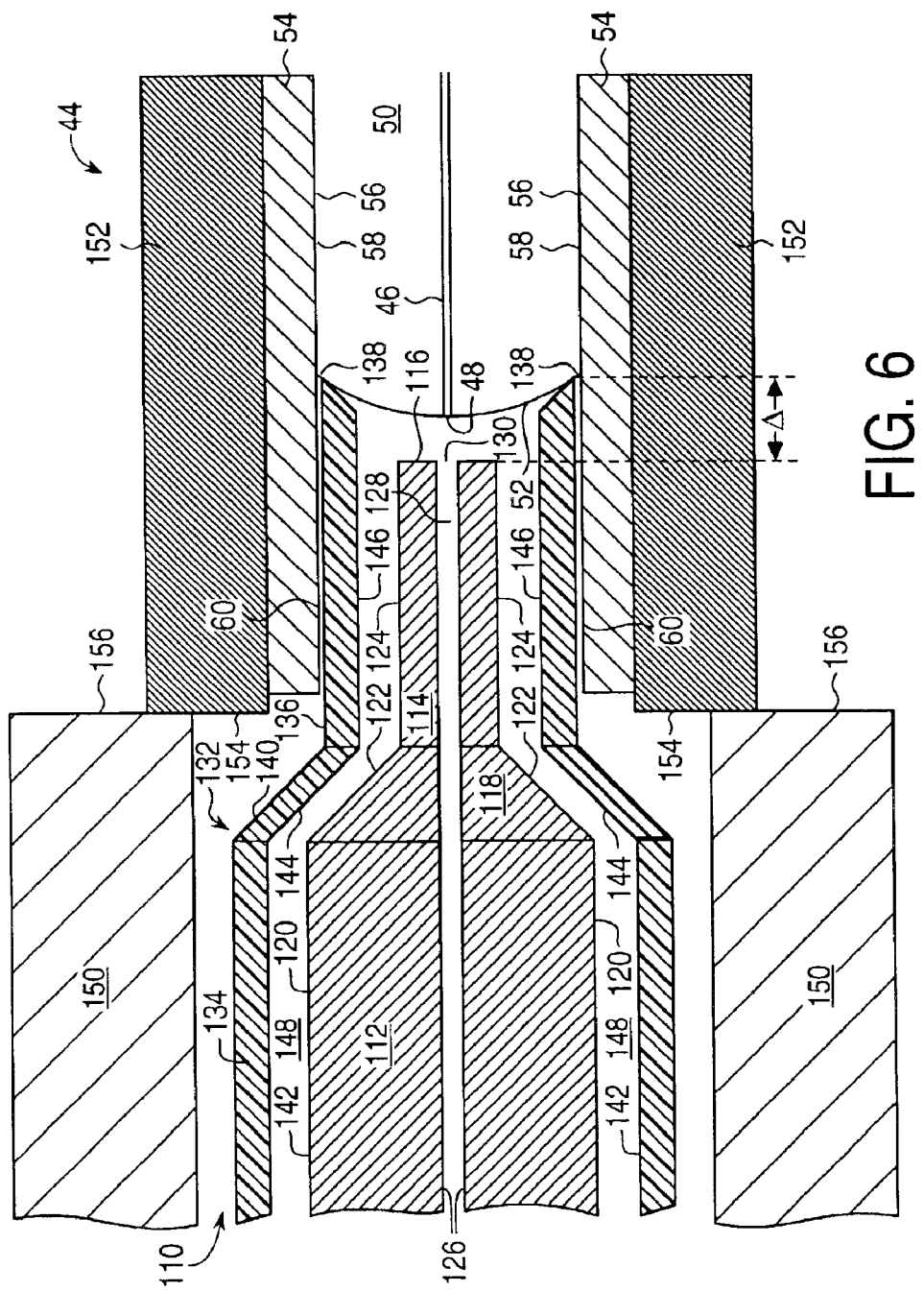
FIG. 6 shows a side-sectional view of a portion of the apparatus similar to FIG. 5, illustrating a stopper for positioning the end portion of the enclosure in the sleeve of the female optical fiber connector for cleaning.

FIG. 6 shows an embodiment of the cleaning apparatus similar to FIG. 5 and described above with the addition of a stopper 150. In the embodiment shown in FIG. 6, the female optical fiber connector 44 is similar to the one shown in FIG. 5 and described above, except that an outer assembly 152 of the connector adapter is provided which encloses the guiding sleeve 54. Different types of adapters can have very different structures, and the structure in FIG. 5 is just an illustration. The outer assembly 152 has an end 154. This stopper can protect any overstress on the enclosure tip 138. As mentioned above, the enclosure tip wall is thin; any over pressing on the enclosure tip against the connector surface may cause tip damage. A proper setting of the stopping line should still allow a good sealing between the enclosure tip 138 and the connector ferrule surface 48, 52; on the other hand, it prevents the tip 138 from being over-pushed on the ferrule surface 48, 52. This stopper takes away any excessive pressure. In this embodiment, the stopper 150 on the cleaning apparatus which surrounds a portion of the enclosure 132 of the cleaning apparatus has an end 156 that abuts the outer assembly end 154 of the adapter, when the enclosure tip 138 is well in contact with the ferrule end 52, thereby forming a tightly enclosed chamber for the flow of cleaning fluids to clean the fiber and ferrule end surfaces 48 and 52.

The distance between the end 156 of the stopper 150 and the enclosure tip 138 is determined by the particular type of female optical fiber connector 44 to which the cleaning apparatus is connected. Different types of female connectors may be able to share the same piece of stopper. In an embodiment, the stopper 150 is adjustable along the longitudinal axis for accommodating different depth requirements of different connector adapter structures. For cleaning very different shapes of female connectors, different stoppers may need to be used. In an embodiment, the mounting of the stopper 150 allows an easy exchange. The stopper 150 is made of a hard material such as a metal to ensure that the end 156 of the stopper 150 does not deform appreciably when pressed against the end 154 of the outer connector assembly 152.

Figure 7:
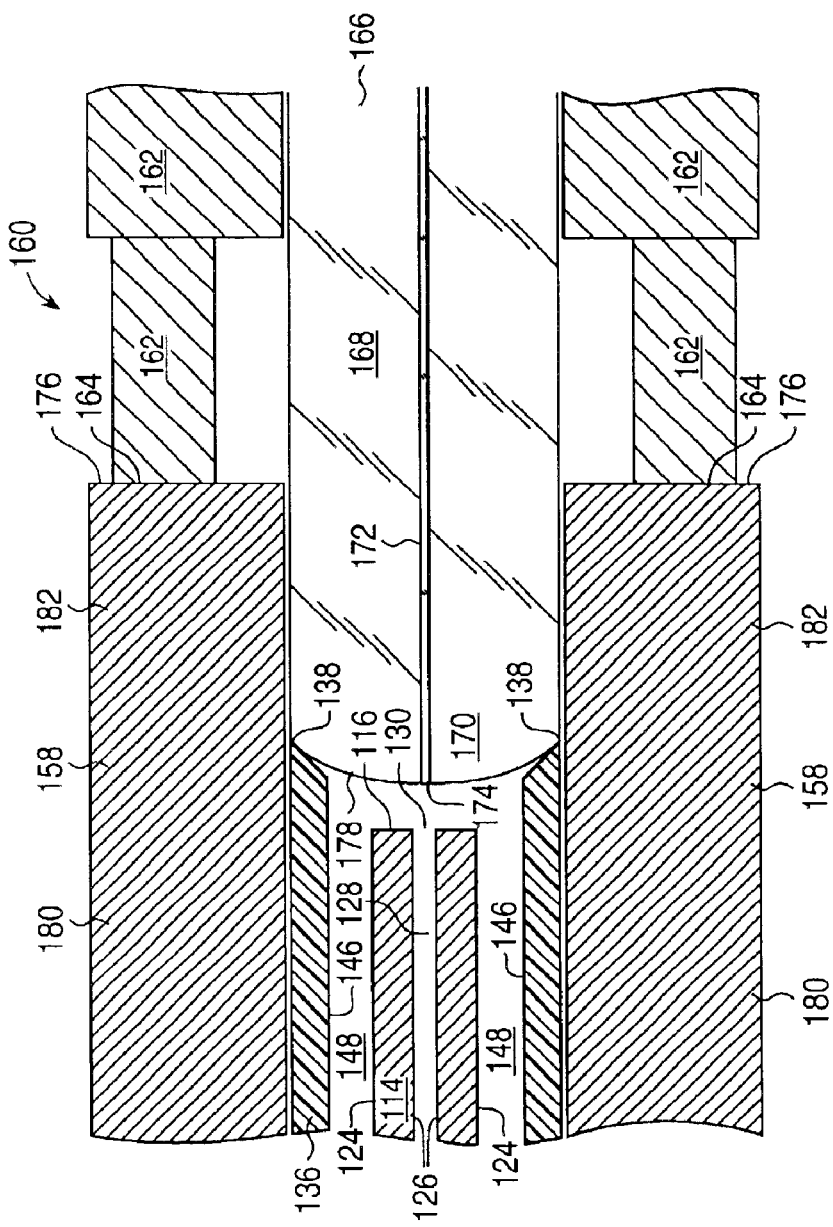
FIG. 7 shows a side-sectional view of the apparatus of FIGS. 5–6, with a male-to-female converter for cleaning the fiber and ferrule end surfaces of a male optical fiber connector.

The cleaning apparatus according to embodiments of the present invention as shown in FIGS. 1–6 and described above are not limited to cleaning female optical fiber connectors with guiding sleeves. The cleaning apparatus may also be adapted for cleaning exposed fiber and ferrule end surfaces of a male connector. FIG. 7 shows a side-sectional view of the end portion of the cleaning apparatus similar to the one shown in FIG. 6 and described above, with the addition of a male-to-female converter 158 attached to the end portion of the cleaning apparatus to enclose the exposed portion of a male optical fiber connector 160.

As shown in FIG. 7, the male optical fiber connector 160 has a connector assembly 162 which terminates at a connector assembly end 164. The ferrule 166 has a first portion 168 within the male connector assembly 162 and a second portion 170 which extends beyond the connector assembly end 164. In the embodiment shown in FIG. 7, a portion of the male connector assembly is in contact with the ferrule 166 while another portion of the connector assembly is the frame structure. The sizes and shapes of connector assemblies may be different for different types of male connectors. An optical fiber 172 which is surrounded by the ferrule 166 terminates at a fiber end 174 at a predetermined distance from the connector assembly end 164.

The male-to-female converter 158 has an end 176 which abuts the connector assembly end 164 to form a female structure. The apparatus described above for female connectors can be used in the same way after this conversion. In addition, the same idea about the stopper described above can be applied in this converter for protecting the cleaner enclosure tip from any over pressing.

In an embodiment, the male-to-female converter 158 has a first portion 180 which surrounds the end portion 136 of the cleaner enclosure and a second portion 182 which extends beyond the enclosure tip 138 with a length that matches the second portion 170 of the ferrule 166 extending beyond the connector assembly end 164. The length of the second portion 182 of the male-to-female converter 158 beyond the enclosure tip 138 may be adjustable in an embodiment to match different lengths of exposed portions of ferrules of different male connectors. Alternatively, the male-to-female converter 158 may be detached from the cleaning apparatus, and different male-to-female converters may be provided for matching different types of male connectors. In an embodiment, the male-to-female converter 158 is made of a hard material such as a metal with no appreciable deformation to ensure that the enclosure tip 138 contacts the end surface 178 of the ferrule 166 at the appropriate position when the end 176 of the male-to-female converter 158 abuts the connector assembly end 164.

In the embodiments shown in FIGS. 1–7 and described above, the fiber and ferrule end surfaces are cleaned by the ultrasonic cavitation effect generated by the end portion of the resonant ultrasound launcher in an active resonant zone from the resonant launcher end to the fiber and ferrule end surfaces, which is immersed in a cleaning liquid. In an embodiment, each cleaning cycle includes a washing period, a rinsing period and a drying period to facilitate the cleaning of each optical fiber connector. Multiple cleaning cycles can be implemented to improve the cleaning result. A programmable control of intermittent liquid flow and air flow is provided in an embodiment to allow fast switching of different stages in each cleaning cycle.

During the washing period, the cleaning liquid is provided to the tightly enclosed chamber, and the flow of the cleaning liquid is controlled to ensure that the active zone between the launcher end and the fiber and ferrule end surfaces is full of the cleaning liquid without air bubbles. In an embodiment, this cleaning liquid is compressed so that it can be pumped up, when needed in some cases, from the cleaning water container at a low level to the handset at a high level. The cleaning liquid may be pure water, a water-based solution, or another type of cleaning solution such as alcohol, ethanol, etc. In many cases, a water-based solution is generally a suitable choice in view of environmental safety as well as ultrasonic cleaning efficiency. In an embodiment, some surfactant can be added in the water to act as a cleaning agent to facilitate the removal of contaminants such as particulate matter or oil. Examples of water-soluble surfactants include conventional soaps and detergents.

The mechanical vibrations produced by the resonant ultrasound launcher are capable of heating up the cleaning liquid, which may effectively improve the cleaning efficiency of the cleaning liquid. The dirty liquid after ultrasonic washing is sucked out through the tightly enclosed chamber. After the ultrasound is stopped, a steady flow of the water solution provides the rinse. After rinsing, the water supply is stopped and atmosphere air is fed to the tightly enclosed chamber. This air replacement is for a pressure balance in the suction channel.

Figure 8:
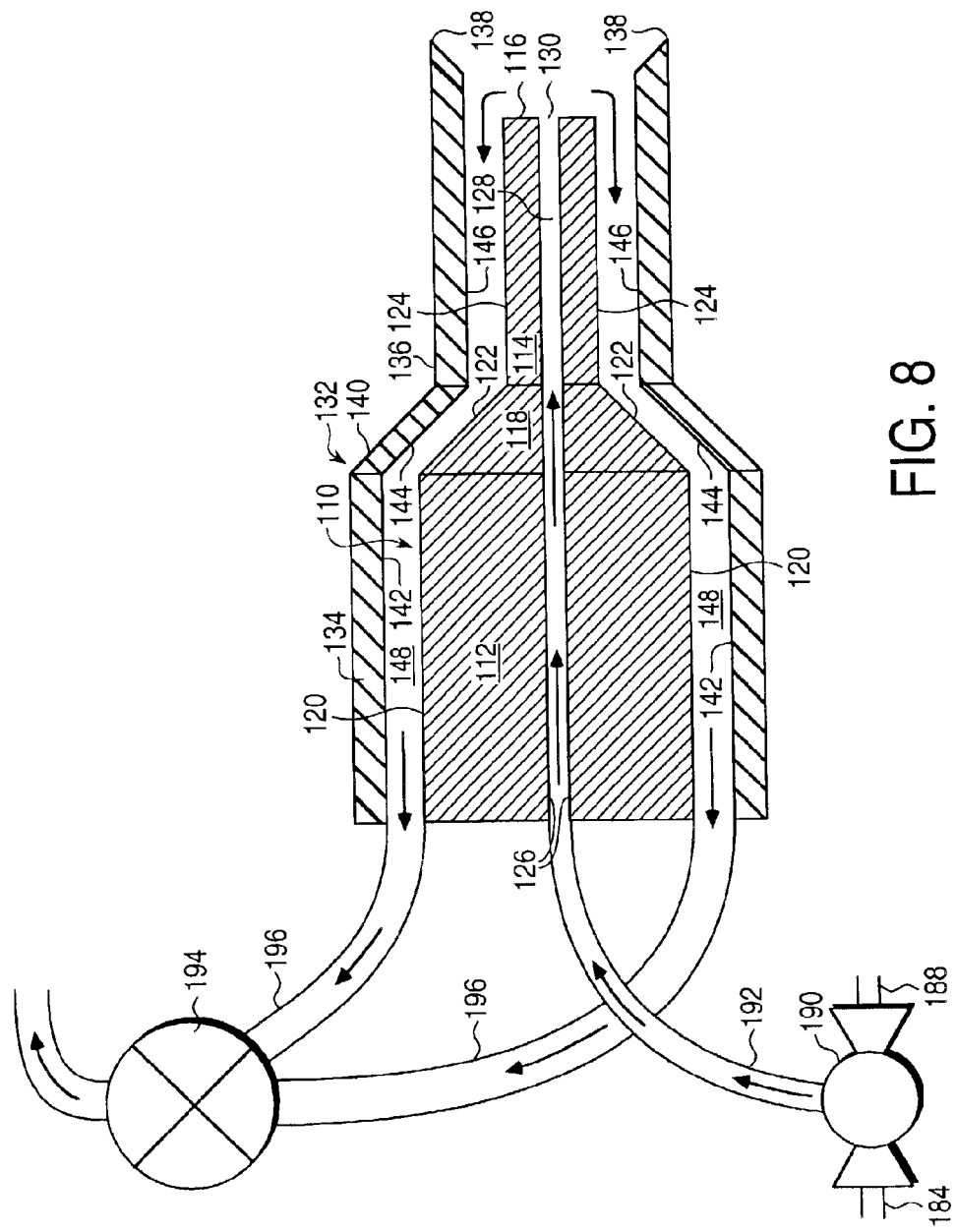
FIG. 8 shows a diagram illustrating a three-way valve and a pump for conveying the washing or rinsing fluid or drying air through the center and side channels of the apparatus as shown in FIGS. 5–7 for cleaning the fiber and ferrule end surfaces of an optical fiber connector.

FIG. 8 shows an embodiment of a mechanism for supplying fluid and air through the cleaning apparatus. In FIG. 8, a supply line 184 for the cleaning liquid and the rinsing liquid and a supply line 188 for atmospheric air are connected to a three-way valve 190. Via valve 190, the central line 192 for liquid/air delivery is switched to be connected to the cleaning liquid supply line 184 or the air supply line 188, depending upon whether the cleaning apparatus is in the washing/rinsing period or the drying period in a cleaning cycle. The used fluid is sucked out from the side channel 148 within the enclosure 132 by a pump 194, which is connected to the side channel 148 through a pipeline 196. In an alternate embodiment, the cleaning liquid and air may be supplied to the enclosed chamber in the cleaning apparatus through the side channel 148, and a pump may be connected to the center channel 128 to suck out the used fluid.

Figure 9:
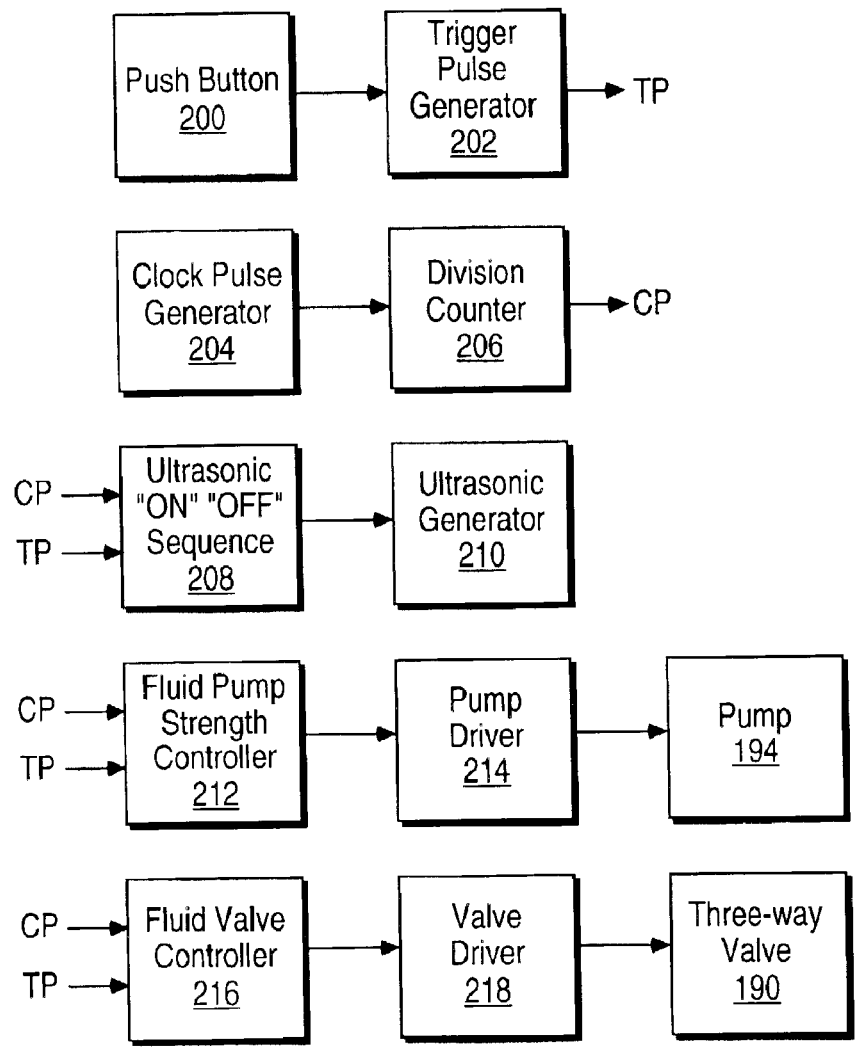
FIG. 9 shows a block diagram illustrating an embodiment of a control system for controlling the ultrasound transducer, the pump and the three-way valve.

In an embodiment, the cleaning operation which includes washing, rinsing and drying operations in a cleaning cycle is fully automatic with a press of a switch button. FIG. 9 shows a block diagram illustrating an embodiment of an automatic controller for controlling the operations of the pump 194 and the three-way valve 190 as shown in FIG. 8. Referring to FIG. 9, a push button 200 controls a trigger pulse generator 202, which generates a trigger pulse (TP) with a predetermined pulse duration. A clock pulse generator 204 is connected a division counter 206 for generating a clock pulse train (CP). The clock pulse train and the trigger pulse are fed to an ultrasonic on-off sequence generator 208 which is connected to an ultrasonic generator circuit 210 to excite the ultrasound transducer.

In an embodiment in which the ultrasound transducer comprises a piezo-electric device, the electrical signals generated by the ultrasonic generator circuit 210 may be fed directly to the ultrasound transducer to produce mechanical vibrations at desired ultrasound frequencies. In an embodiment, the clock train and the trigger pulse may be fed to a fluid pump rate controller 212, which is connected to a pump driver 214 for driving the pump 194. The circuit provides timing and pump rate control for a desirable setting. The clock pulse train and the trigger pulse may also be fed to a liquid-air valve controller 216, which is connected to a valve driver 218 for driving the three-way valve 190 as shown in FIG. 8. The circuit in FIG. 9 is fully programmable.

Figure 10:
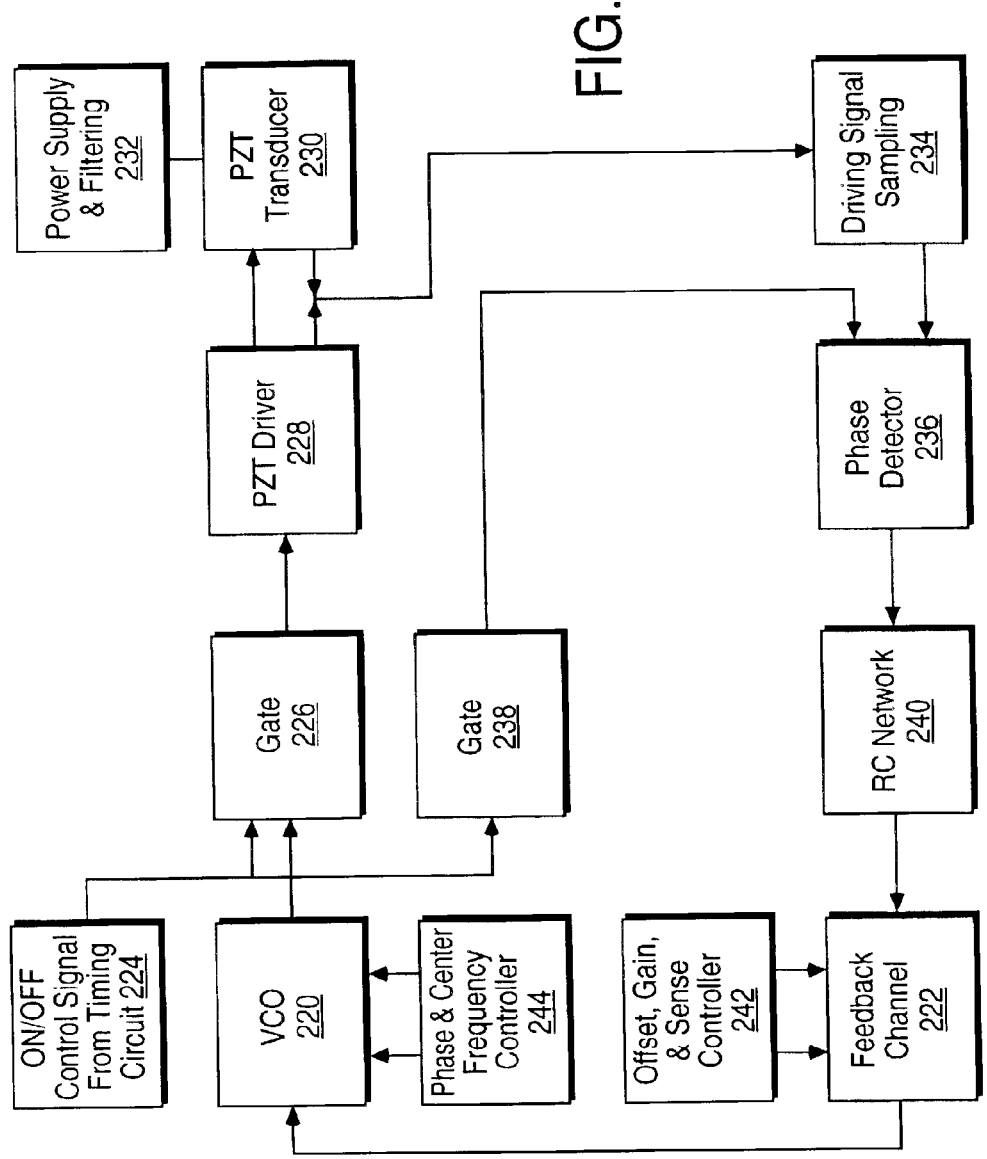
FIG. 10 shows a block diagram illustrating an embodiment of a phase-locked loop (PLL) for keeping the ultrasound generation at a desired frequency.

FIG. 10 shows a block diagram illustrating an embodiment of a control system for controlling the generation of ultrasonic waves by an ultrasound transducer, such as a piezo-electric transducer or PZT. The control system as illustrated in FIG. 10 is a phase locked loop (PLL)-based circuit which comprises a voltage controlled oscillator (VCO) 220 controlled by a feedback channel 222. An on-off control signal 224 from a timing circuit and the VCO 220 are connected to a gate 226, which is in turn connected to a PZT driver 228 for driving a PZT transducer 230. In an embodiment, the PZT driver 228 and the PZT transducer 230 are connected to a driving signal sampling circuit 234, which is in turn connected to a phase detector 236. Another gate 238 which receives the on-off control signal 224 from the timing circuit is also connected to the phase detector 236 to selectively gate driving signal samples from the sampling circuit 234. The output of the phase detector 236 is connected to a resistor-capacitor (RC) network 240. In an embodiment, an offset, gain and sense controller 242 is connected to the feedback channel 222 which receives the output from the RC network 240. The feedback channel 222 feeds the control signal to the VCO 220, thereby forming a feedback loop in the PLL circuit. In an embodiment, a phase and center frequency controller 244 is also connected to the VCO 220 to set the phase and center frequency of the signal generated by the VCO 220. A PLL circuit automatically tracks the sonic frequency to enhance ultrasound generation.

Figure 11:
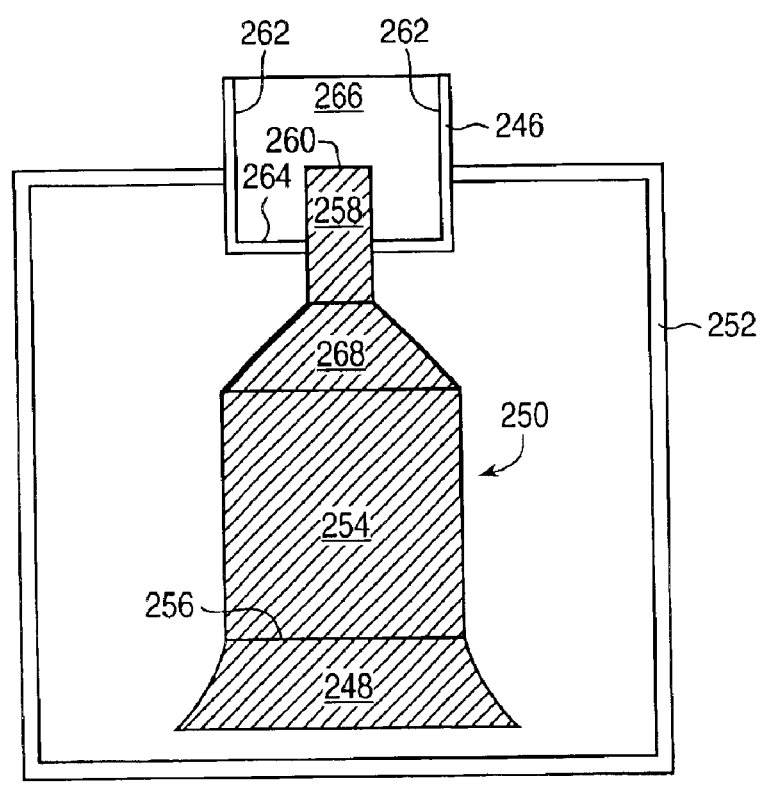
FIG. 11 shows a side-sectional view of another embodiment of the apparatus for cleaning optical fiber parts according to the present invention, with a miniature cleaning bath for cleaning various types of male connectors or other fiber optic parts.

FIG. 11 shows a side-sectional view of another embodiment of the cleaning apparatus according to the present invention, with a miniature cleaning bath 246 for cleaning male optical fiber connectors as well as other types of optical fiber parts with exposed optical fiber surfaces. In the embodiment shown in FIG. 11, an ultrasound transducer 248 and a resonant ultrasound launcher 250 are provided in a housing 252. The resonant ultrasound transducer 250 has a base portion 254 which is connected to the end 256 of the transducer 248 and an end portion 258 which terminates at a launcher end 260.

At least a portion of the end portion 258 including the end 260 of the resonant ultrasound launcher 250 is positioned within the cleaning bath 246 and immersed in a cleaning liquid for cleaning an optical fiber part, which is also immersed in the cleaning liquid in the cleaning bath 246. In an embodiment, the cleaning bath 246 has inner surfaces 262 and 264 defining a cleaning chamber 266 in which the cleaning liquid is held. The end 260 of the resonant ultrasound launcher 250 generates ultrasound vibrations to cause ultrasonic cavitation in the cleaning liquid in the cleaning chamber 266 to clean the optical fiber part immersed in the liquid. After the cleaning liquid becomes dirty, it may be drained from the cleaning chamber by a suction tube, for example.

The resonant ultrasound launcher 250 in FIG. 11 may also have a transitional portion 268 between the base portion 254 and the end portion 258, to achieve a desirable quality factor and resonant bandwidth. Although a sloped transitional portion 268 is shown in FIG. 11, a stepped transitional portion may be provided between the base portion and the end portion in an alternate embodiment. Two or more stages of stepped or sloped transitions or a combination of stepped and sloped transitions may be provided in the resonant ultrasound launcher to achieve a desired Q and a desired resonant bandwidth. Furthermore, the resonant ultrasound launcher 250 the ultrasound transducer 248 may be made of the same metallic material in an embodiment for efficient transmission of ultrasound energy from the transducer 248 to the resonant ultrasound launcher 250.

Figure 12:
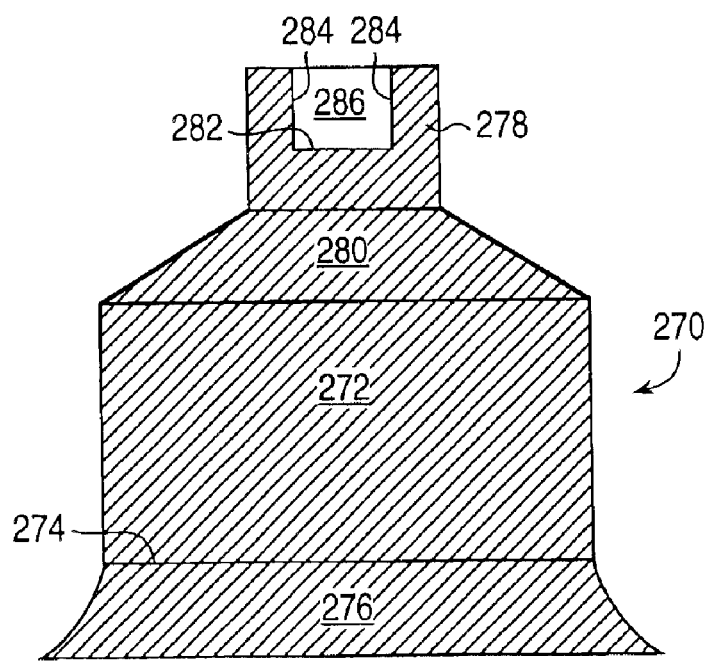
FIG. 12 shows a side-sectional view of another embodiment of the apparatus for cleaning male connectors or other optical fiber parts according to the present invention, with a miniature cleaning bath integrated in the end portion of the resonant ultrasound launcher.

FIG. 12 shows a side-sectional view of an apparatus for cleaning optical fiber parts in an embodiment according to the present invention, with a miniature cleaning bath integrated into the end portion of the resonant ultrasound launcher. In FIG. 12, the resonant ultrasound launcher 270 has a base portion 272 connected to the end 274 of an ultrasound transducer 276, an end portion 278, and a transitional portion 280 between the base portion 272 and the end portion 278. The end portion 278 of the resonant ultrasound launcher 270 has an end wall 282 and at least one side wall 284 defining a cleaning chamber 286 in which a cleaning liquid is held for cleaning an optical fiber part immersed in the cleaning liquid.

In this embodiment, the end portion 278 of the resonant ultrasound launcher 270 is large enough to allow an optical fiber part such as a male optical fiber connector to be contained in the cleaning chamber 286 for ultrasonic cleaning. In this case, ultrasound is generated from both end wall 282 and the side wall 284. Both the end and side surfaces of an optical fiber part such as a male connector may be cleaned by the cleaning liquid in the cleaning chamber 286 in which the optical fiber part is immersed. Ultrasonic cavitation is imparted to the cleaning liquid in the cleaning chamber 286 by the end wall 282 and the side wall 284 of the end portion 278 of the resonant ultrasound launcher 270. In this embodiment, both the side wall 284 and the end wall 286 are integral parts of the end portion 278 of the resonant ultrasound launcher 270, thereby resulting in a higher level of efficiency in cleaning multiple surfaces of an optical fiber part immersed in the cleaning liquid in the chamber 286.

The transitional portion 280 between the base portion 272 and the end portion 278 of the resonant ultrasound launcher 270 may have one or more stages of sloped or stepped transitions in a similar manner to the embodiments described above. In an embodiment, the resonant ultrasound launcher 270 and the ultrasound transducer 276 may be made of the same metal and are tightly coupled to each other for efficient transfer of ultrasound energy.

Figure 13A:
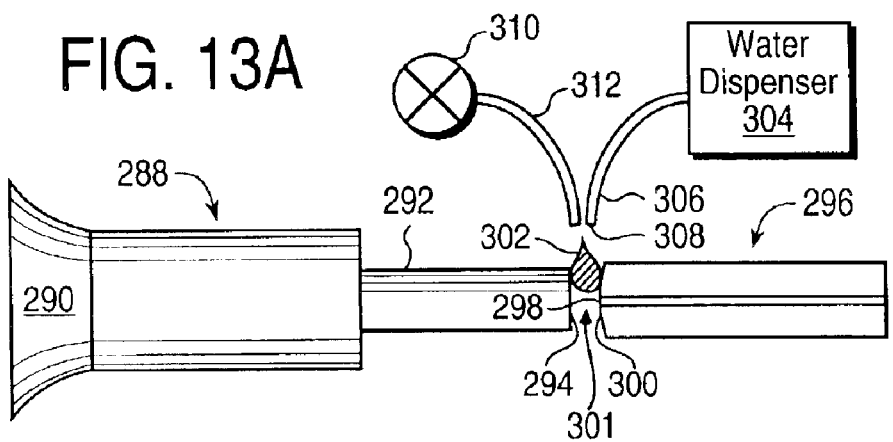
Figure 13B:
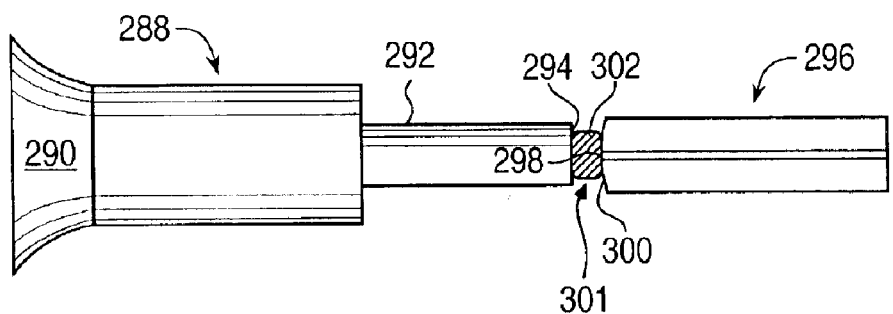
Figure 13C:
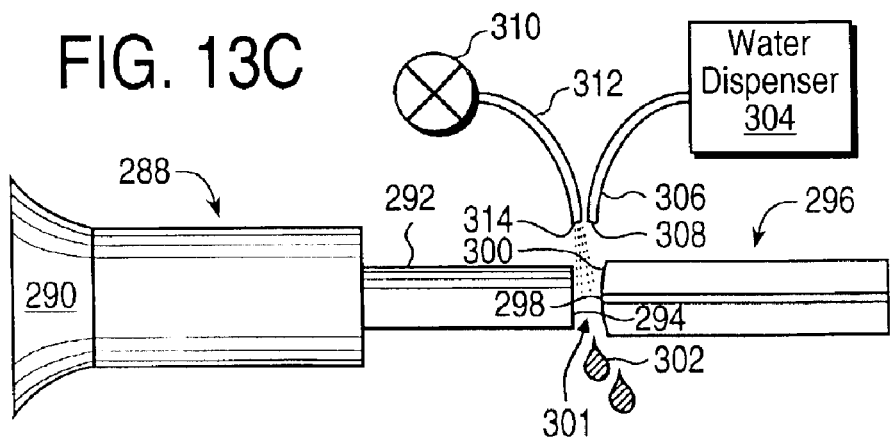

FIGS. 13A–C show side views of yet another embodiment of the cleaning apparatus according to the present invention, for cleaning the end surface of a male optical fiber connector without the need for an enclosure to contain the cleaning liquid. In FIG. 13A, a resonant ultrasound launcher 288 which is connected to an ultrasound transducer 290 has an end portion 292 terminating at a launcher end 294. The fiber end 298 and the ferrule end 300 of a male optical fiber connector 296 is positioned opposite the end 294 of the resonant ultrasound launcher 288 with a gap 301 in between for holding a drop of a cleaning fluid 302 such as water when ultrasound vibrations are imparted to the cleaning liquid by the end 294 of the resonant ultrasound launcher 288. In FIG. 13A, a water dispenser 304 is connected to a water pipe 306 which has an end 308 positioned above the gap 301 between the launcher end 294 and the fiber and ferrule end surfaces 298 and 300, to dispense a drop of clean water to wash the fiber and ferrule end surfaces 298 and 300.

FIG. 13B illustrates the drop of water 302 which is held within the gap 301 between the end 294 of the resonant ultrasound launcher 288 and the fiber and ferrule end surfaces 298 and 300 of the male connector 296 by the surface tension of the water 302 and by the ultrasound vibrations applied to the water. In an embodiment, the gap 301 between the launcher end 294 and the fiber and ferrule end surfaces 298 and 300 is approximately the width of a typical drop of water. When the ultrasound vibration stops, the surface tension of the water by itself is usually not strong enough to hold the water 302 within the gap 301 between the launcher end 294 and the fiber and ferrule end surfaces 298 and 300. The water 302 will usually drop from the gap 301 by gravity once the ultrasound vibration stops. For a secondary washing or for rinsing, another fresh drop of clean water can be dispensed into the gap to refresh the liquid there.

FIG. 13C illustrates an air pump 310 which is connected to an air pipe 312 for blowing air to the gap 301 to dry the fiber and ferrule end surfaces 298 and 300 of the male optical fiber connector 296. The air pipe 312 has an end 314 which is positioned above the gap 301 for supplying pressurized air to the gap. In case the surface tension of the water is strong enough to hold the water in the gap 301 after the ultrasound vibration stops, pressurized air may be supplied by the air pump 310 to force the water 302 out of the gap 301. Even if the water 302 drops by gravity after the ultrasound vibration stops, a small amount of water may remain on the fiber and ferrule end surfaces 298 and 300. Pressurized air supplied by the air pump 310 can be blown into the gap 301 to facilitate drying the fiber and ferrule end surfaces 298 and 300.

From the above description of embodiments of the present invention, it is manifest that various equivalents can be used to implement the concepts of the invention without departing from its scope. Moreover, while the invention has been described with specific reference to certain embodiments, a person of ordinary skill in the art would recognize that changes can be made in form and detail without departing from the spirit and scope of the invention. The described embodiments are to be considered in all respects as illustrative and not restrictive. It should also be understood that the invention is not limited to the particular embodiments described herein, but is capable of many equivalents, rearrangements, modifications, and substitutions without departing from the scope of the invention as set forth in the claims.

What is claimed is:

1. An apparatus for cleaning an optical fiber part, comprising:
    a resonant ultrasound launcher comprising a base portion and an end portion terminating at a launcher end;
    an enclosure having an end portion terminating at an enclosure tip, the end portion having an inner surface defining a hollow interior in which the end portion of the resonant ultrasound launcher is positioned, wherein the inner surface of the end portion of the enclosure is concentric with the end portion of the resonant ultrasound launcher, and wherein the launcher end is recessed from the enclosure tip by a differential depth;
    an ultrasound transducer having a transducer end connected to the base portion of the resonant ultrasound launcher;
    a base ring connected to the ultrasound transducer;
    a movable ring connected to the enclosure; and
    a positioning ring connected between the base ring and the movable ring for adjusting the enclosure relative to the launcher end to change the differential depth.

2. The apparatus of claim 1, wherein the resonant ultrasound launcher further comprises a transitional portion disposed between the base portion and the end portion of the resonant ultrasound launcher.

3. The apparatus of claim 2, wherein the transitional portion of the resonant ultrasound launcher comprises at least one stepped cylindrical portion.

4. The apparatus of claim 2, wherein the transitional portion of the resonant ultrasound launcher comprises at least one sloped portion with progressively decreasing diameters between the base portion and the end portion of the resonant ultrasound launcher.

5. The apparatus of claim 1, wherein the ultrasound transducer and the resonant ultrasound launcher are made of an identical material.

6. The apparatus of claim 5, wherein the material of the ultrasound transducer and the resonant ultrasound launcher comprises a metal.

7. The apparatus of claim 1, wherein the base portion of the resonant ultrasound launcher has a diameter equal to that of the transducer end.

8. The apparatus of claim 1, wherein the positioning ring comprises a threaded ring that is rotatable to adjust the differential depth.

9. The apparatus of claim 1, further comprising:
    a flange connected to the ultrasound transducer; and
    at least one clamp connected between the flange and the base ring.

10. The apparatus of claim 1, further comprising at least one offset ring connected between the movable ring and the enclosure, said at least one offset ring machined to attain concentricity of the inner surface of the end portion of the enclosure with the end portion of the resonant ultrasound launcher.

11. The apparatus of claim 1, wherein the optical fiber part comprises an optical fiber connector comprising:
    an optical fiber terminating at a fiber end; and
    a ferrule enclosing the optical fiber and having a ferrule end of a predefined shape adjacent to the fiber end.

12. The apparatus of claim 11, wherein the optical fiber connector comprises a female optical fiber connector comprising a guiding sleeve having an inner surface comprising a first portion enclosing the ferrule and a second portion extending beyond the ferrule end.

13. The apparatus of claim 12, wherein the female optical fiber connector further comprises an outer connector assembly surrounding the guiding sleeve and having a connector assembly end, further comprising a stopper surrounding a portion of the enclosure and having an end that abuts the connector assembly end.

14. The apparatus of claim 11, wherein the optical fiber connector comprises a male optical fiber connector comprising a male connector assembly having a connector assembly end, wherein the ferrule has a first portion within the male connector assembly and a second portion extending beyond the connector assembly end.

15. The apparatus of claim 14, further comprising a male-to-female adapter, comprising:
    a first portion surrounding the enclosure; and
    a second portion extending beyond the enclosure tip, the second portion having a length that matches the second portion of the ferrule and an end that abuts the connector assembly end.

16. The apparatus of claim 11, wherein the enclosure tip is shaped to match the predefined shape of the ferrule end forming a tightly enclosed chamber.

17. A method for cleaning an optical fiber connector using the apparatus of claim 16, comprising the steps of:
    filling the tightly enclosed chamber with a cleaning liquid;
    producing ultrasound vibrations in the cleaning liquid by the resonant ultrasound launcher to wash the optical fiber connector; and removing the cleaning liquid from the tightly enclosed chamber.

18. The method of claim 17, further comprising
    passing a rinsing liquid through the tightly enclosed chamber for rinsing the optical fiber connector after washing the optical fiber connector.

19. The method of claim 18, further comprising
    blowing air through the tightly enclosed chamber for drying the optical fiber connector after rinsing the optical fiber connector.

20. An apparatus for cleaning an optical fiber part, comprising:
- a resonant ultrasound launcher comprising a base portion, an end portion terminating at a launcher end, and an intermediary portion between the base portion and the end portion, the resonant ultrasound launcher having outer surfaces and an inner surface defining a center channel with an opening at the launcher end for flow of a fluid;
- an enclosure having a base portion and an end portion terminating at an enclosure tip, the enclosure having inner surfaces spaced apart from the outer surfaces of the resonant ultrasound launcher defining a side channel for the flow of the fluid, wherein the launcher end is recessed from the enclosure tip by a differential depth;
- an ultrasound transducer having a transducer end connected to the base portion of the resonant ultrasound launcher;
- a base ring connected to the ultrasound transducer;
- a movable ring connected to the enclosure; and
- a positioning ring connected between the base ring and the movable ring for adjusting the enclosure relative to the launcher end to change the differential depth.

21. The apparatus of claim 20, wherein the intermediary portion of the resonant ultrasound launcher comprises a sloped portion with progressively decreasing diameters between the base portion and the end portion of the resonant ultrasound launcher, and wherein the enclosure further comprises an intermediary portion with progressively decreasing diameters between the base portion and the end portion of the enclosure.

22. The apparatus of claim 20, wherein the ultrasound transducer and the resonant ultrasound launcher are made of an identical material.

23. The apparatus of claim 22, wherein the material of the ultrasound transducer and the resonant ultrasound launcher comprises a metal.

24. The apparatus of claim 20, wherein the base portion of the resonant ultrasound launcher has a diameter equal to that of the transducer end.

25. The apparatus of claim 20, wherein the positioning ring comprises a threaded ring that is rotatable to adjust the differential depth.

26. The apparatus of claim 20, further comprising:
- a flange connected to the ultrasound transducer; and
- at least one clamp connected between the flange and the base ring.

27. The apparatus of claim 20, further comprising at least one offset ring connected between the movable ring and the enclosure, said at least one offset ring machined to attain concentricity of the inner surfaces of the enclosure with the outer surfaces of the resonant ultrasound launcher.

28. The apparatus of claim 20, wherein the optical fiber part comprises an optical fiber connector comprising:
- an optical fiber terminating at a fiber end; and
- a ferrule enclosing the optical fiber and having a ferrule end of a predefined shape adjacent to the fiber end.

29. The apparatus of claim 28, wherein the optical fiber connector comprises a female optical fiber connector comprising a guiding sleeve having an inner surface comprising a first portion enclosing the ferrule and a second portion extending beyond the ferrule end.

30. The apparatus of claim 29, wherein the female optical fiber connector further comprises an outer connector assembly surrounding the guiding sleeve and having a connector assembly end, further comprising a stopper surrounding a portion of the enclosure and having an end that abuts the connector assembly end.

31. The apparatus of claim 28, wherein the optical fiber connector comprises a male optical fiber connector comprising a male connector assembly having a connector assembly end, wherein the ferrule has a first portion within the male connector assembly and a second portion extending beyond the connector assembly end.

32. The apparatus of claim 31, further comprising a male-to-female adapter, comprising:
- a first portion surrounding the enclosure; and
- a second portion extending beyond the enclosure tip, the second portion having a length that matches the second portion of the ferrule and an end that abuts the connector assembly end.

33. The apparatus of claim 28, wherein the enclosure tip is shaped to match the predefined shape of the ferrule end forming a tightly enclosed chamber.

34. A method for cleaning an optical fiber connector using the apparatus of claim 33, comprising the steps of:
- filling the tightly enclosed chamber with a cleaning liquid via the center channel;
- producing ultrasound vibrations in the cleaning liquid by the resonant ultrasound launcher to wash the optical fiber connector; and
- removing the cleaning liquid from the tightly enclosed chamber via the side channel.

35. The method of claim 34, further comprising:
- passing a rinsing liquid through the tightly enclosed chamber via the center channel and the side channel for rinsing the optical fiber connector after washing the optical fiber connector.

36. The method of claim 35, further comprising:
- blowing air through the tightly enclosed chamber via the center channel and the side channel for drying the optical fiber connector after rinsing the optical fiber connector.

37. The apparatus of claim 33, further comprising:
- a plurality of conduits connected to the center and side channels to convey the fluid through the tightly enclosed chamber;
- a three-way valve connected to at least one of the conduits; and
- a pump connected to another one of the conduits.

38. A method for cleaning a male optical fiber connector having a fiber and ferrule end using an apparatus comprising a resonant ultrasound launcher comprising a base portion and an end portion terminating at a launcher end; and an ultrasound transducer having a transducer end connected to the base portion of the resonant ultrasound launcher, the method comprising:
- holding the apparatus substantially horizontally so that the launcher end is positioned opposite the fiber and ferrule end forming a gap having a width sufficient to hold a drop of a cleaning fluid therein when the resonant ultrasound launcher produces vibrations in the drop of the cleaning fluid; dispensing a drop of said cleaning fluid into said gap; and vibrating said drop of said cleaning fluid to clean said fiber and ferrule end.

39. The method of claim 38, wherein the resonant ultrasound launcher further comprises a transitional portion disposed between the base portion and the end portion.

40. The method of claim 39, wherein the transitional portion of the resonant ultrasound launcher comprises at least one stepped cylindrical portion.

41. The method of claim 39, wherein the transitional portion of the resonant ultrasound launcher comprises at least one sloped portion with progressively decreasing diameter, between the base portion and the end portion.

42. The method of claim 38, wherein the ultrasound transducer and the resonant ultrasound launcher are made of an identical material.

43. The method of claim 42, wherein the material of the ultrasound transducer and the resonant ultrasound launcher comprises a metal.

44. The method of claim 38, wherein the cleaning fluid comprises water, and the apparatus further comprises a water dispenser for dispensing the water to the gap to wash the optical fiber connector.

45. The method of claim 44, wherein the apparatus further comprises an air pump for blowing air to the gap to dry the optical fiber connector.

\* \* \* \* \*